United States Patent
Gautier Graindorge (10) Patent No.: US 11,898,654 B2
(45) Date of Patent: Feb. 13, 2024

(54) HEATING CARTRIDGE FOR A THERMOSTATIC MEMBER, AND THERMOSTATIC VALVE COMPRISING SUCH A CARTRIDGE

(71) Applicant: VERNET, Ollainville (FR)

(72) Inventor: Guillaume Gautier Graindorge, Montigny le Bretonneux (FR)

(73) Assignee: VERNET, Ollainville (FR)

( * ) Notice: Subject to any disclaimer, the term of this patent is extended or adjusted under 35 U.S.C. 154(b) by 913 days.

(21) Appl. No.: 15/733,228

(22) PCT Filed: Dec. 14, 2018

(86) PCT No.: PCT/EP2018/084910
§ 371 (c)(1),
(2) Date: Jun. 12, 2020

(87) PCT Pub. No.: WO2019/115749
PCT Pub. Date: Jun. 20, 2019

(65) Prior Publication Data
US 2020/0386343 A1 Dec. 10, 2020

(30) Foreign Application Priority Data
Dec. 15, 2017 (FR) ...................................... 1762226

(51) Int. Cl.
*F16K 31/02* (2006.01)
*H01R 13/11* (2006.01)
(Continued)

(52) U.S. Cl.
CPC .......... *F16K 31/025* (2013.01); *H01R 13/113* (2013.01); *H01R 13/5219* (2013.01);
(Continued)

(58) Field of Classification Search
CPC ... H05B 3/42; H05B 3/80; H05B 3/78; H05B 3/48; H05B 3/06; H01R 13/5219; H01R 13/113; F16K 31/025; F01P 2070/04
See application file for complete search history.

(56) References Cited

U.S. PATENT DOCUMENTS 4,337,621 A * 7/1982 Lane, Jr. .............. G05D 23/021
60/527
7,275,697 B2 * 10/2007 Roman ................ G05D 23/023
137/861
(Continued)

FOREIGN PATENT DOCUMENTS

| CN | 105899779 A | 8/2016 |
|---|---|---|
| CN | 106550502 A | 3/2017 |

(Continued)

OTHER PUBLICATIONS

Rapport De Recherche Préliminaire issued in corresponding French Patnet Application No. FR 1762226 dated Sep. 3, 2018.
(Continued)

*Primary Examiner* — Brian W Jennison
(74) *Attorney, Agent, or Firm* — TROUTMAN PEPPER HAMILTON SANDERS LLP (57) ABSTRACT

A heating cartridge with a thermally conductive tube which can be immersed in a thermodilatable material of a thermostatic member. Having a cylindrical body extending axially via a flare; internal electric heating; a base of a plastic material, secured to the tube by overmolding the flare, supporting an electrical connection between the heater and an external current source, and is suitable to be received in a casing of the valve housing. A seal is attached to the base and has a first portion pressed radially against the housing in the casing so as to seal the interior of the casing. In order to improve the sealing of said cartridge, the seal also includes a second portion, which is separate from the first portion and (Continued)

which is pressed radially against the cylindrical body of the tube to seal the overmolding interface between the flare of the tube and the base.

10 Claims, 5 Drawing Sheets

(51) Int. Cl.
    *H01R 13/52*     (2006.01)
    *H05B 3/06*     (2006.01)
    *H05B 3/48*     (2006.01)
    *H05B 3/78*     (2006.01)

(52) U.S. Cl.
    CPC ............... *H05B 3/06* (2013.01); *H05B 3/48* (2013.01); *H05B 3/78* (2013.01); *F01P 2070/04* (2013.01)

(56) References Cited

U.S. PATENT DOCUMENTS

| | | | |
|---|---|---|---|
| 8,217,319 B2 * | 7/2012 | Pottie | H05B 3/06 |
| | | | 219/541 |
| 9,844,097 B2 * | 12/2017 | Pottie | H05B 3/06 |
| 2010/0230399 A1 * | 9/2010 | Pottie | H05B 3/06 |
| | | | 219/482 |
| 2010/0230504 A1 * | 9/2010 | Pottie | G05D 23/022 |
| | | | 219/548 |

FOREIGN PATENT DOCUMENTS

| | | |
|---|---|---|
| DE | 44 44 685 A | 6/1996 |
| EP | 2 175 341 A2 | 4/2010 |
| FR | 2 943 148 A1 | 9/2010 |
| FR | 2 943 149 A1 | 9/2010 |
| FR | 3 024 519 A1 | 2/2016 |
| WO | 2014/090986 A1 | 6/2014 |

OTHER PUBLICATIONS

Rapport De Recherche Internationale issued in corresponding International Patent Application No. PCT/EP2018/084910 dated Feb. 8, 2019.

* cited by examiner

HEATING CARTRIDGE FOR A THERMOSTATIC MEMBER, AND THERMOSTATIC VALVE COMPRISING SUCH A CARTRIDGE

CROSS REFERENCE TO RELATED APPLICATIONS

This is a U.S. National Phase Application under 35 U.S.C. § 371 of International Patent Application No. PCT/EP2018/084910, filed Dec. 14, 2018, which claims priority of French Patent Application No. 1762226, filed Dec. 15, 2017. The entire contents of which are hereby incorporated by reference.

FIELD OF THE INVENTION

The present invention relates to a heating cartridge for a thermostatic element, as well as a thermostatic valve comprising such a cartridge.

BACKGROUND

In many applications in the fluids field, in particular for cooling vehicle heat engines, thermostatic valves are used to distribute a fluid entering various circulation channels, based on the temperature of that fluid. These valves are said to be thermostatic because the movement of their inner gate pin(s) is controlled by a thermostatic element, i.e., an element that comprises a cup containing a thermodilatable material and a piston able to slide relative to the cup under the action of the thermodilatable material when the latter expands.

SUMMARY

To distribute the fluid as a function of other parameters, in particular conditions outside the valve, such as the ambient temperature or the load of the vehicle propelled by the engine equipped with the valve, it is known to incorporate an electric cartridge into the valve in order to heat the thermodilatable material, which makes it possible to control the valve from outside it, independently of or in addition to the temperature of the incoming fluid, in particular using an onboard computer in the vehicle programmed appropriately. In practice, the heating cartridge comprises electric heating means, such as a heating resistance, arranged inside the aforementioned piston or a similar tube: for example, by immobilizing the piston in the casing of the valve, the power supply of the resistance causes the temperature of the thermodilatable material to increase, which, by extension of the latter, causes the cup to slide around the piston, a sealing member for example being supported by that cup to act on the flow of fluid through the valve. To supply electricity to the heating means, the cartridge comprises connectors allowing the electrical connection of electrical conduction wires, belonging to the heating means, and power supply terminals that extend to the outside of the casing, where they are connected to an outside current source. FR 2,943,148, which discloses this type of thermostatic valve and heating cartridge, provides that the aforementioned connectors are supported by a plastic base, which is secured to the tube by overmolding a flare of this tube, located at the end of the latter opposite that submerged in the thermodilatable material. In the assembled state of the valve, this base is received in a housing of the casing, while being pressed therein against the casing in the axial direction of the tube, such that this base at least partially experiences the usage stresses absorbed by the tube.

To prevent the fluid circulating in the valve from infiltrating to the base and reaching the electrical connectors, the heating cartridge can be equipped with a seal, like that proposed in FR 2,943,148. This seal is fastened to the base, while surrounding the flare of the tube, and when the base is assembled to the valve casing while being received in the aforementioned housing, the flare of the tube keeps the seal pressed radially against the casing in the housing so as to seal the inside of the housing. This solution yields satisfactory results, but depends on the dimensional allowances of the flare: if the flare is manufactured with very large dimensional deviations, the radial bearing of the seal in the housing risks being insufficient to preserve the sealing, in particular when fluid circulates in the valve with pressures of several bars.

The aim of the present invention is to propose a heating cartridge with improved sealing.

To that end, the invention relates to a heating cartridge for a thermostatic element, including:
- a tube, which is thermally conductive and which is suitable for being immersed in a thermodilatable material of the thermostatic element, the tube comprising a cylindrical body, centered on a longitudinal axis and extending axially with a flare,
- electric heating means arranged inside the cylindrical body,
- a base made of a plastic material, which base:
  - is secured to the tube by overmolding of the flare of the tube,
  - supports an electric connection between the electric heating means and an external current source, and
  - is suitable for being received in a housing of a casing, and
- a seal, which is attached to the base and which includes a first part which, when the base is received in the housing of the casing, is pressed radially against the casing in the housing so as to seal inside of the housing, characterized in that the seal also includes a second part, which is separate from the first part of the seal and which is pressed radially against the cylindrical body of the tube so as to seal an overmolding interface between the flare of the tube and the base.

The idea at the base of the invention is to provide a sort of double sealing, that is to say, a first sealing for the inside of the housing, done by a first part of the seal that is interposed radially between the base and the casing when the base is in the housing of the casing, and a second sealing for the overmolding interface between the flare of the tube and the base, done by a second part of the seal designed to radially grip not the flare of the tube, but the cylindrical body of the tube from which this flare extends. These first and second parts of the seal are provided to be separate from one another, which makes it possible for the respective sealings that they procure to be independent from one another. Additionally, compared with its flare, the tube has much smaller machining allowances at its cylindrical body, in particular because the latter is manufactured in rectilinear form: in this way, the sealing done by the second part of the seal is controlled, that is to say, has a guaranteed minimal performance, including when the heating cartridge is integrated into a valve in which pressurized fluid circulates.

According to additional advantageous features of the heating cartridge according to the invention:

the first and second parts of the seal are made in one piece.

the second part of the seal comprises a crown, which grips the cylindrical body of the tube and which is coupled to the first part of the seal by a discoid wall of the second part of the seal, this discoid wall extending transversely to the longitudinal axis and being designed to press the crown radially against the cylindrical body of the tube.

the crown is toroidal.

the discoid wall is provided with stiffening ribs that extend lengthwise substantially radially to the longitudinal axis.

at least some of the stiffening ribs protrude from a face of the discoid wall, which is turned axially away from the base.

the first part of the seal includes a tubular wall, which is substantially centered on the longitudinal axis and has an axial end that couples the first part of the seal to the second part of the seal, and the tubular wall is provided, on an inner face thereof, with a tongue that is engaged in a peripheral groove of the base to fasten the seal to the base, the peripheral groove being provided such that a first radial expanse of the tongue engages therein as long as the base is not inserted into the housing of the casing and such that a second radial expanse of the tongue, greater than the first radial expanse, engages therein when the base is inserted in the housing of the casing.

the tubular wall is also provided, on a lower face thereof, with an inner bead, which is located axially between the tongue and said axial end of the tubular wall, and which is pressed axially against a stop of the base so as to keep the seal fastened to the base when the base is inserted axially into the housing of the casing.

the tubular wall is provided, on an outer face thereof, with at least one outer bead or several outer beads, distributed along the longitudinal axis, this outer bead or each of these outer beads being suitable for radially contracting the tubular wall around the base when the base is axially inserted into the housing of the casing.

The invention also relates to a thermostatic valve, including:

a thermostatic element, comprising a heating cartridge, as defined above, and a cup containing a thermodilatable material in which the tube of the heating cartridge is immersed, and a casing delimiting a housing in which the base of the heating cartridge is received.

BRIEF DESCRIPTION OF THE DRAWINGS

The invention will be better understood upon reading the following description, provided solely as an example and done in reference to the drawings, in which.

DETAILED DESCRIPTION OF THE DRAWINGS

Figure 2:
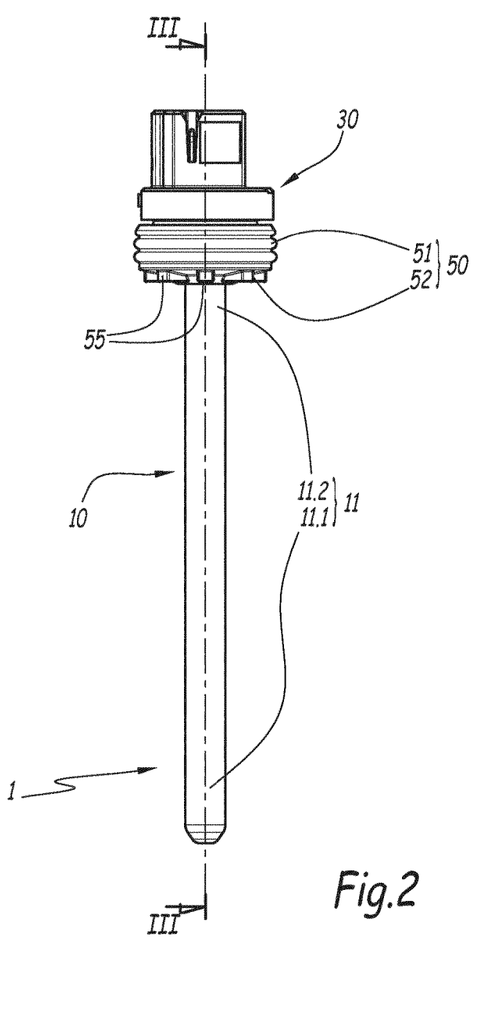
FIG. 2 is an elevation view along arrow II of FIG. 1.
Figure 3:
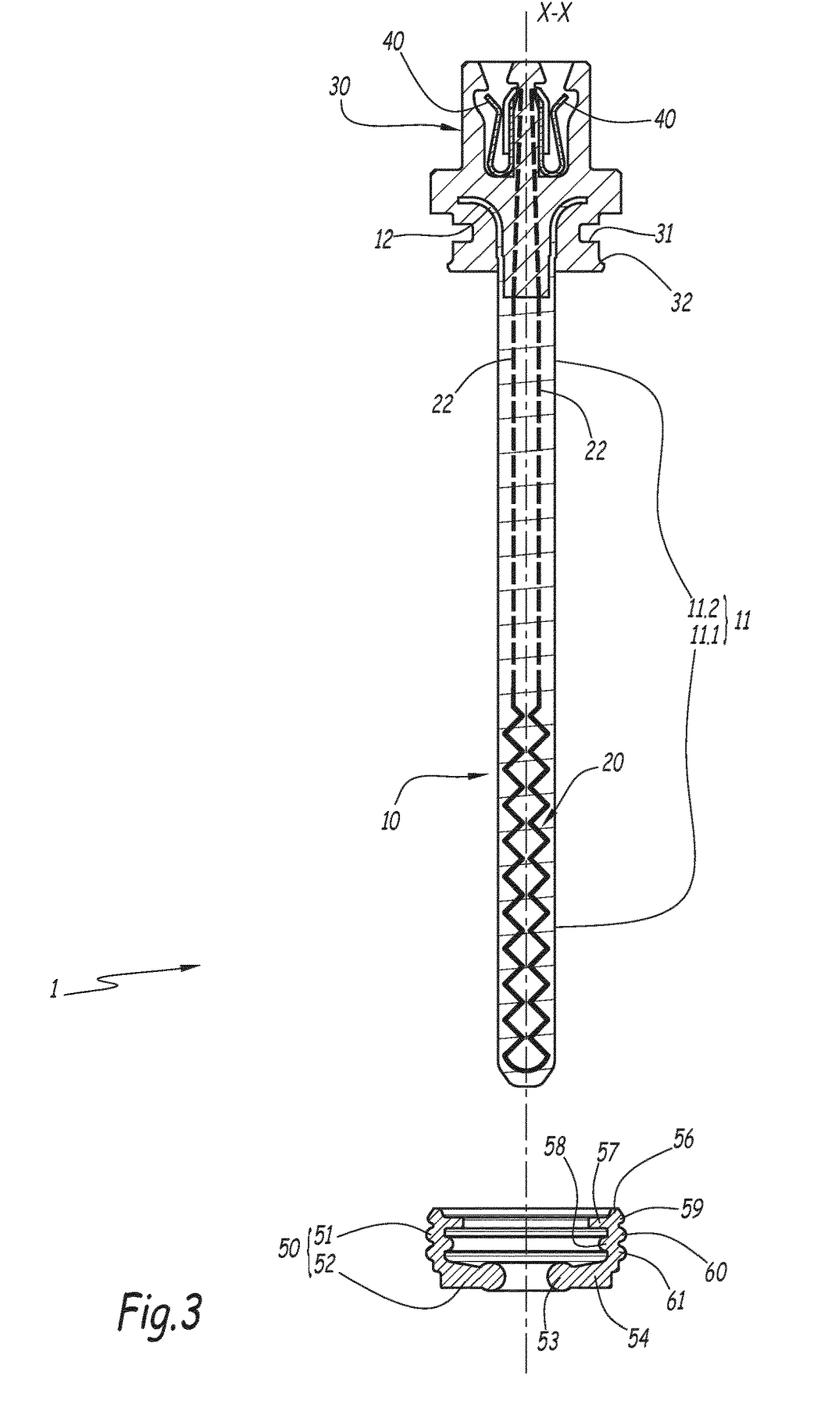
FIG. 3 is a sectional view along line III-III of FIG. 2, showing the heating cartridge with its seal not yet assembled to the rest of the heating cartridge.
Figure 4:
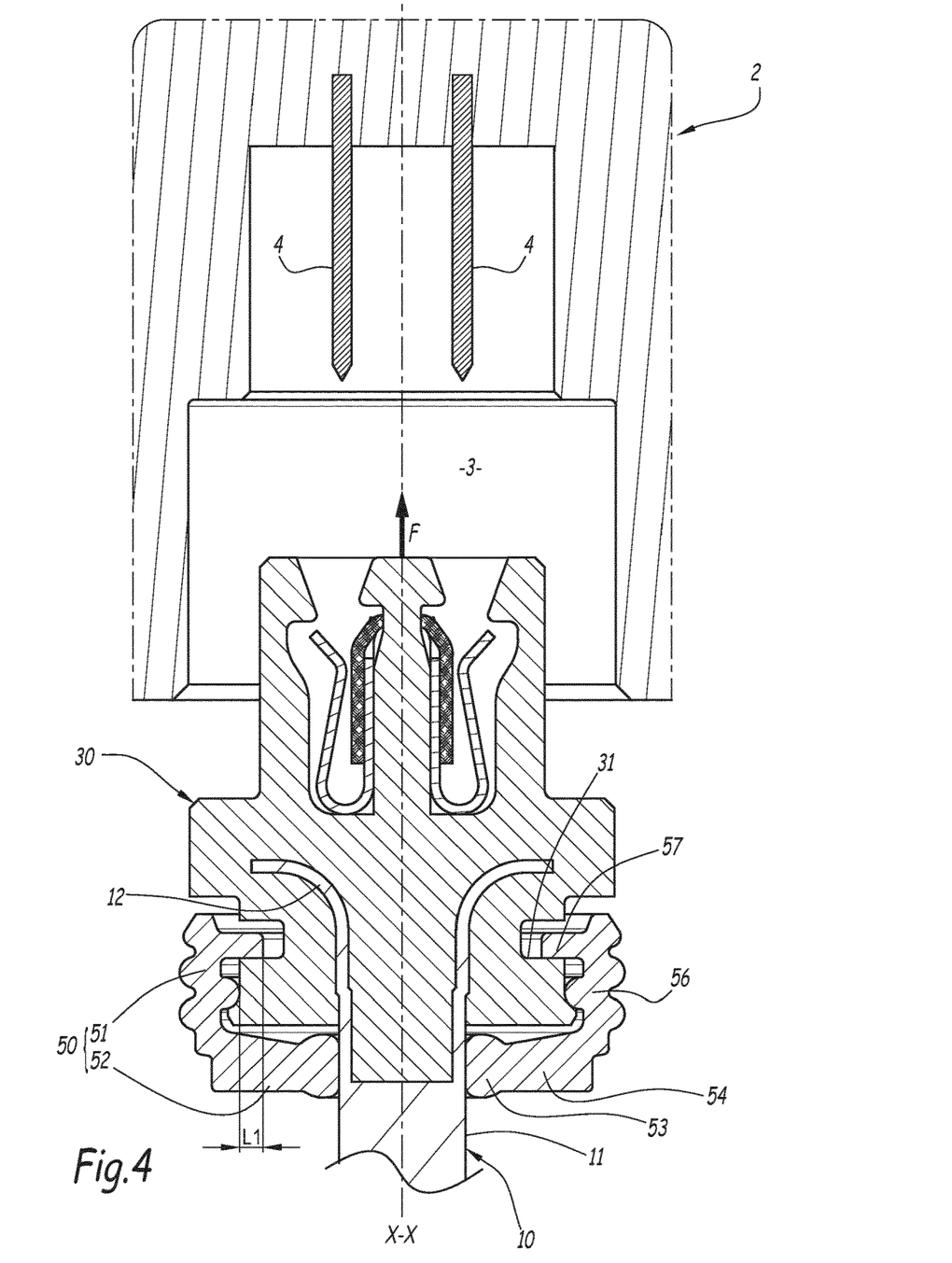
FIG. 4 is a sectional view, in the same plane as FIG. 3, of part of the heating cartridge with its seal assembled to the rest of this heating cartridge, the latter being associated with a casing of a valve to which the heating cartridge can be assembled.
Figure 5:
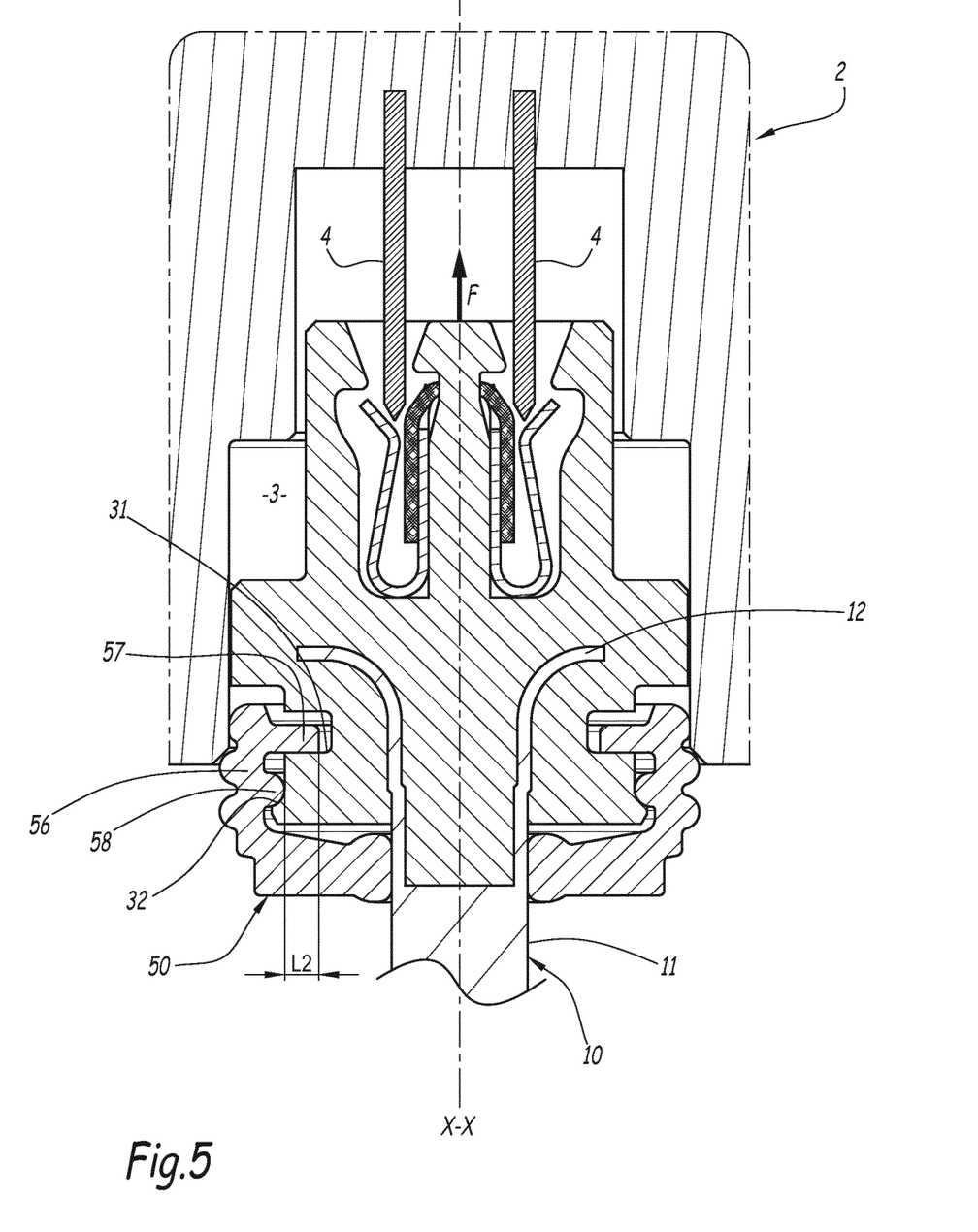
FIG. 5 is a view similar to FIG. 4, showing, on a larger scale, a detail of the heating cartridge during assembly to the casing of the valve.
Figure 6:
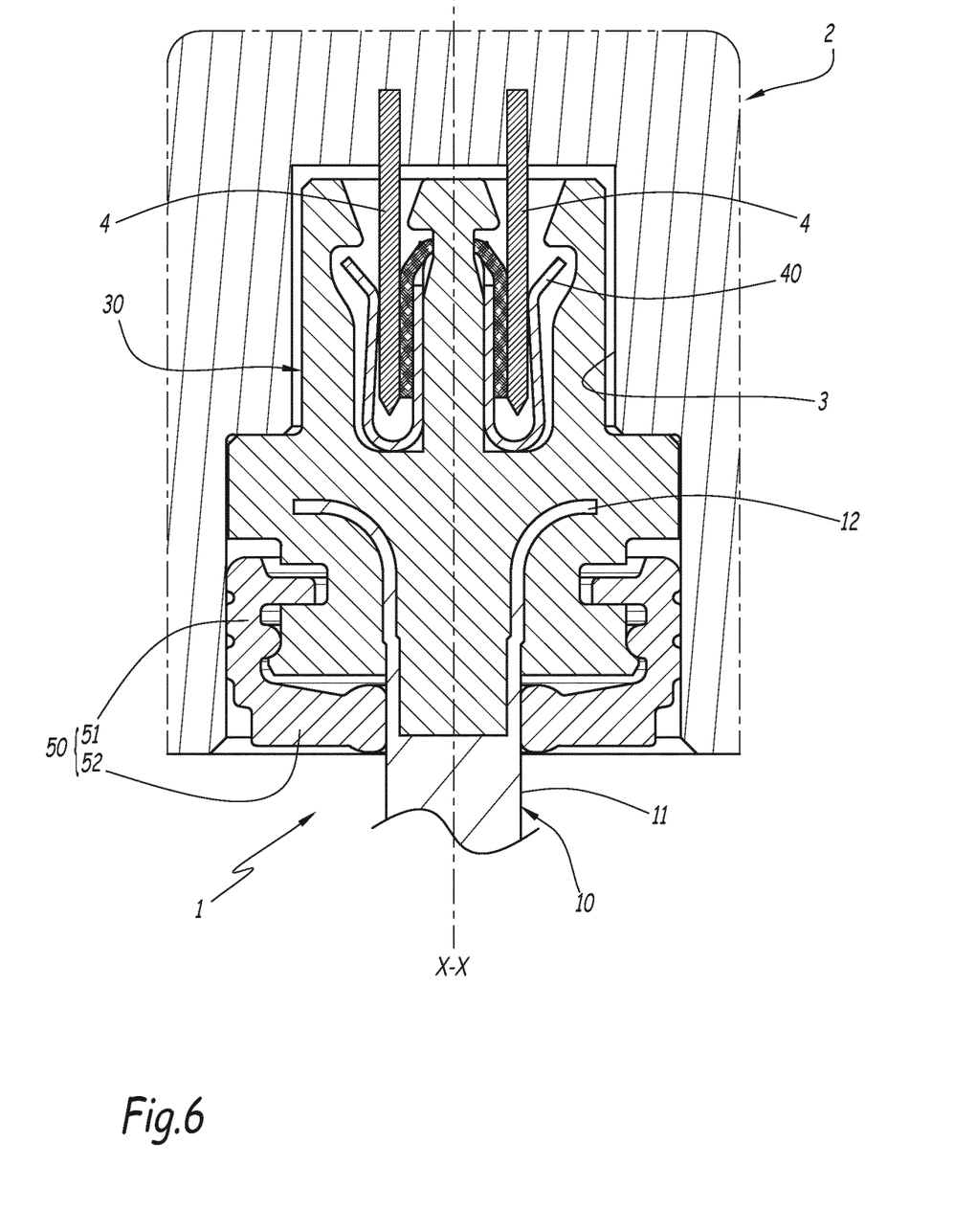
FIG. 6 is a view similar to FIG. 4, showing the heating cartridge assembled to the casing of the valve.

FIGS. 1 to 6 show a heating cartridge 1 which, in FIGS. 4 to 6, is associated with a casing 2 of a thermostatic valve, having noted that in these FIGS. 4 to 6, the casing 2 is only partially shown. More generally, the aforementioned thermostatic valve is not shown, aside from the heating cartridge 1 and the part of the casing 2 shown in the figures, having stressed that the other specificities of this thermostatic valve are not limiting with respect to the invention and are known in the field. As an example, the reader may refer to FR 2,943,148 for a non-limiting example of such specificities for the thermostatic valve.

Figure 1:
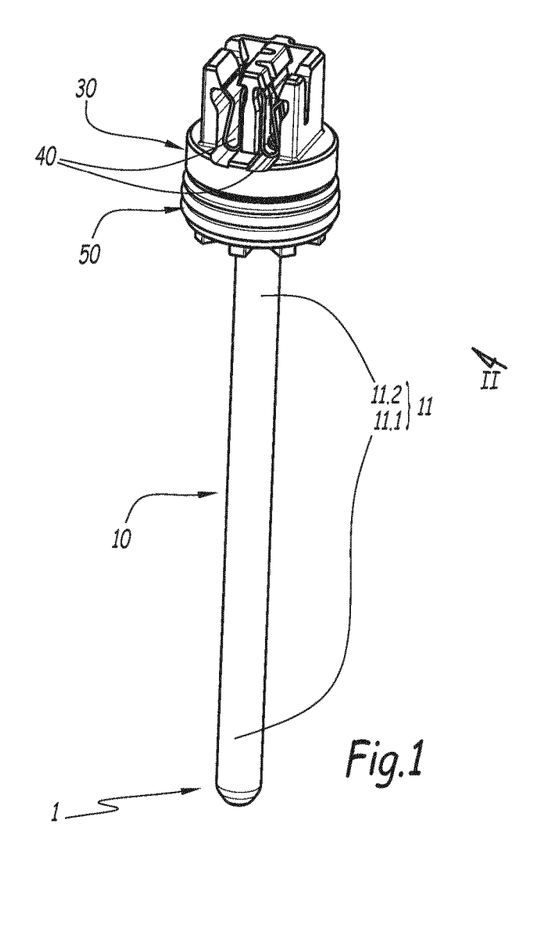
FIG. 1 is a perspective view of a heating cartridge according to the invention.

As clearly shown in FIGS. 1 to 3, the heating cartridge 1 comprises a metal tube 10 that is primarily made from a cylindrical body 11. The cylindrical body 11 is centered on a longitudinal axis X-X, for example with a circular base like in the figures.

The heating cartridge 1 also comprises an electric heating resistance 20 that, as schematically illustrated in FIG. 3, is arranged inside the cylindrical body 11 of the tube 10, such that a main heating body 21 of this resistance 20 occupies a terminal part 11.1 of the cylindrical body 11, facing downward in the figures. During use, the terminal part 11.1 of the cylindrical body 11 of the tube 10 is submerged in a thermodilatable material contained in a cup, not shown, of a thermostatic element, so that this thermodilatable material is heated by the main heating body 21. The heating resistance 20 is only one example of electric heating means that, arranged inside the terminal part 11.1 of the cylindrical body 11 of the tube 10, make it possible to heat, through this tube made from a thermally conductive material, the aforementioned thermodilatable material.

For convenience, the remainder of the description is oriented relative to the axis X-X: the terms "lower", "bottom" and the like describe a direction oriented toward the terminal part 11.1 of the cylindrical body 11, while the terms "upper", "top" and the like describe a direction in the opposite sense. The terminal part 11.1 of the cylindrical body 11 thus constitutes a lower terminal part for this cylindrical body.

As clearly shown in FIG. 3, an upper terminal part 11.2 of the cylindrical body 11 of the tube 10 extends axially upward with a flare 12 of the tube 10. The precise geometry of this flare 12 is not limiting inasmuch as the latter has a shape that flares outward while moving upward. In particular, the flared shape, shown in the figures, is not the only conceivable one, and for example, FR 2,943,148 discloses an alternative flared shape. In practice, the flare 12 is integral with the cylindrical body 11, while for example being obtained by stamping the upper end of the tube 10.

As clearly shown in FIGS. 1 to 3, the heating cartridge 1 also comprises a base 30 that is secured to the tube 10 while closing off the upper end. This base 30 is made from a plastic material that is molded on the flare 12 of the tube 10, as well as, if applicable, on the upper end of the upper terminal part 11.2 of the cylindrical body 11, while leaving most or even all of this cylindrical body free. Thus, the base 30 is secured to the tube 10 by overmolding of the flare 12 of the latter.

As shown in FIGS. 4 to 6, the base 30 is designed to be received in a housing 3 of the casing 2, which is complementary to the base, so as to assemble the heating cartridge 1 to the casing 2. In practice, the base 30 is inserted axially upward into the housing 3, until it bears axially against the casing in the housing, typically at ad hoc stop shoulder(s) and/or surface(s), provided on the base and in the housing. The corresponding developments of the base 30 are not limiting, and a detailed example of these developments is provided in FR 2,943,148, to which the reader may refer.

As clearly shown in FIG. 3, the base 30 is passed all the way through, in the direction of the axis X-X, by electrical conduction wires 22 coming from the main heating body 21 of the resistance 20. These wires 22 are connected to the main heating body 21 or make up the connection terminals thereof. In all cases, the wires 22 extend lengthwise from the inside of the lower terminal part 11.1 of the cylindrical body 11, to the outside of the tube 10, while passing through the upper terminal part 11.2 of the cylindrical body 11, then through the flare 12 at which these wires pass axially through the base 30. One upper end of each of the wires 22 emerges from the base 30, at a dedicated region of the base where the respective upper ends of the wires are provided to be connected to an outside current source, having noted that in practice, this connection is done after the heating cartridge 1 has been assembled to the casing 2. In the exemplary embodiment considered in the figures, the upper ends of the wires 22 are respectively placed in open upper cavities of the base that, when the heating cartridge 1 is assembled to the casing 2 like in FIG. 6, can each receive a terminal 4 for connecting to the outside current source, the connection between each terminal 4 and the upper end of the corresponding wire 22 advantageously being provided by a connector 40 that is attached in the corresponding cavity of the base 30 and then makes it possible to pinch the terminal and the upper end of the wire against one another. Details of this exemplary embodiment are provided in FR 2,943,149. Of course, other embodiments can be considered for the electrical connection supported by the base 30, between the heating resistance 20 and the aforementioned outside current source.

Furthermore, the heating cartridge 1 also comprises a seal 50 that, in the assembled state of the heating cartridge, is fastened to the base 30, as shown in FIGS. 1 and 2. As described in detail below, the seal 50 includes two separate parts, namely an upper part 51 and a lower part 52, which perform different respective functions: the upper part 51 makes it possible both to fasten the seal 50 to the base 30 and to seal the inside of the housing 3 of the casing 2 when the base 30 is received in this housing, while the lower part 52 makes it possible to seal the overmolding interface between the flare 12 of the tube 10 and the base 30.

Although they are separate in particular from a functional perspective, the upper 51 and lower 52 parts of the seal 50 are advantageously made in one piece, like in the exemplary embodiment considered in the figures. In other words, the upper 51 and lower 52 parts are then integral with one another, the seal 50 being a molded seal, molded in one piece.

In the exemplary embodiment considered in the figures, and as more particularly shown in FIG. 3, the lower part 52 of the seal 50 comprises both a crown 53, centered on a geometric axis that is aligned with the axis X-X when the seal 50 is fastened to the base 30, and a discoid wall 54, which extends transversely, or generally perpendicular, with respect to the axis X-X and which couples the crown 53 to the upper part 51 of the seal 50. In the assembled state of the heating cartridge 1, that is to say, when the seal 50 is fastened to the base 30 like in FIGS. 1, 2 and 4 to 6, the crown 53 grips the upper terminal part 11.2 of the cylindrical body 11 of the tube 10, while being pressed radially against this upper terminal part 11.2 by the discoid wall 54. More generally, it will be understood that the lower part 52 of the seal 50 is designed to be pressed radially not against the flare 12 of the tube 10, which is overmolded by the base 30, but directly against the cylindrical body 11 of this tube 10, below the base 30: in this way, the lower part 52 of the seal 50 seals the part of the tube 10 placed above this lower part 52, with respect to what is located below this lower part 52. The lower part 52 thus in particular seals the overmolding interface between the flare 12 of the tube 10 and the base 30, as clearly shown in FIG. 4.

To further improve the sealing procured by the lower part 52 of the seal 50, the crown 53 is advantageously toroidal.

Additionally, the discoid wall 54 is advantageously provided with stiffening ribs 55, clearly shown in FIG. 2, which extend lengthwise substantially radially with respect to the axis X-X and which reinforce the pressing effect of the crown 53 on the tube 10, procured by the discoid wall 54. It will be noted that at least some of the stiffening ribs 54 are wisely provided protruding from the lower face of the discoid wall 54, that is to say, from the face of this discoid wall that is turned axially away from the base 30, like in the exemplary embodiment considered in the figures: in this way, these stiffening ribs 55 form reliefs on the lower side of the seal 50 facilitating the gripping and handling of the latter, both by an ad hoc tool and manually by a human operator.

In the exemplary embodiment considered in the figures, the upper part 51 of the seal 50 includes a tubular wall 56 centered on a geometric axis that, when the seal 50 is fastened to the base 30, finds itself aligned with the axis X-X. As clearly shown in FIG. 3, the lower axial end of the wall 56 couples the upper 51 and lower 52 parts of the seal 50 to one another, in particular couples the rest of the tubular wall 56 to the discoid wall 54. On its lower face, the tubular wall 56 is provided both with a tongue 57 and an inner bead 58, the latter being located axially between the tongue 57 and the lower axial end of the tubular wall 56. In the exemplary embodiment considered here, the tongue 57 and the inner bead 58 each run over the entire inner periphery of the tubular wall 56, having noted that in a variant that is not shown, one and/or the other can run discontinuously. In all cases, the tongue 57 and the inner bead 58 each protrude from the inner face of the tubular wall 56, in other words protrude radially toward the axis X-X. Furthermore, the tubular wall 56 is provided, on its outer face, with three outer beads, namely an upper outer bead 59, an intermediate outer bead 60 and a lower outer bead 61. In the exemplary embodiment considered in the figures, the outer beads 59, 60 and 61 run continuously over the entire outer periphery of the tubular wall 56, with the understanding that in a variant, one or several of them may only run discontinuously. In all cases, each of the outer beads 59, 60 and 61 is provided protruding from the outer face of the tubular wall 56, that is to say, protruding radially outward relative to the axis X-X. The tongue 57, the inner bead 58 and the outer beads 59, 60 and 61 have other functional features, which will be disclosed hereinafter, in particular in light of FIGS. 4 to 6.

As clearly shown in FIG. 4, the tongue 57 makes it possible to fasten the seal 50 to the base 30, while being engaged in a peripheral groove 31 of the base 30. In practice, the structural flexibility of the tongue 57, in particular its resilient deformation capability with respect to the tubular wall 56, is used to allow the tongue 57 to be folded down against the inner face of the tubular wall 56 when the base 30 begins to be inserted inside this tubular wall 56, then to allow the tongue 57 to be deployed, by resilient return, with respect to the tubular wall 56 and to penetrate inside the peripheral groove 31 once the axial insertion of the base 31 inside the tubular wall 56 brings the tongue 57 and the peripheral groove 31 to substantially the same level along the axis X-X. In other words, during the assembly of the seal 50 to the base 30, the tongue 57 deforms resiliently relative to the rest of the seal 50, until being clipped to the inside of the peripheral groove 31, as clearly shown in comparison with FIGS. 3 and 4. Once the tongue 57 is engaged in the peripheral groove 31 and the seal 50 is thus fastened to the base 30, but as long as this base 30 is not inserted into the housing 3 of the casing 2, it will be noted that the tongue 57 does not touch the radial bottom of the peripheral groove 31, as clearly shown in FIG. 4: in other words, the end of the tongue 57, turned radially toward the axis X-X, is then radially distant from the bottom of the peripheral groove 31, subject to ad hoc dimensioning of the peripheral groove 31. In FIG. 4, reference L1 denotes the radial expanse of the tongue 57, which is then effectively engaged inside the peripheral groove 31.

During the assembly of the heating cartridge 1 with the casing 2, more specifically during the upward axial insertion of the base 30 inside the housing 3 of this casing, indicated by arrow F in FIGS. 4 and 5, the peripheral wall of the housing 3 interferes axially with the outer face of the tubular wall 56, as shown in FIGS. 5 and 6.

In particular, when the seal 50 begins to be inserted inside the housing 3, the peripheral wall of the latter interferes axially with the upper outer bead 59 of the upper part 51, as shown schematically in FIG. 5: under the effect of this interference, the upper outer bead 59 radially contracts, around the base 30, the tubular wall 56, in particular the upper end part of this tubular wall 56. This radial contraction of the tubular wall 56 drives the engagement of the tongue 57 more deeply inside the peripheral groove 31, which amounts to saying that the radial end of the tongue 57, turned toward the axis X-X, radially approaches the bottom of the peripheral groove 31, as shown in FIG. 5: the tongue 57 is then engaged in the peripheral groove 31 with a greater radial expanse L2 than the expanse L1. In this way, the seal 50 is effectively kept in position relative to the base, in particular avoiding any risk of untimely disengagement of the seal with respect to the base during the assembly between the heating cartridge 1 and the casing 2.

Additionally, as the axial insertion of the base 30 inside the housing 3 of the casing 2 continues, the peripheral wall of the housing 3 interferes with the rest of the outer face of the tubular wall 56, in particular interferes with the intermediate outer bead 60, then with the lower outer bead 61. As the peripheral wall of the housing 3 interferes with these beads 60, then 61, each of the latter radially contracts the tubular wall 56 around the base 30. This progressive radial contraction of the tubular wall 56 causes the inner bead 58 to cooperate firmly with the periphery of the base, advantageously by pressing axially against an ad hoc stop, referenced 32, of this base 30, thus making it possible to reinforce the maintenance of the seal on the base during the insertion of the latter inside the housing 3. At the lower terminal part of the tubular wall 56, the radial contraction of the latter is advantageously transmitted to the lower part 52 of the seal 50, through the flexibility of the seal, which tends to accentuate the radial bearing of this part 52 against the cylindrical body 11 of the tube 10.

In consideration of the above explanations, it will be understood that more generally, the upper part 51 of the seal 50 is pressed radially against the casing 2 in the housing 3 of the latter when the base 30 is received in this housing, so as to seal the inside of the housing 3, independently of the sealing procured by the lower part 52 of the seal 50. Additionally, advantageous developments of the upper part 51 of the seal 50, such as the tongue 57 and/or the inner bead 58 and/or the outer beads 59, 60 and 61, facilitate and secure the assembly of the heating cartridge 1 with the casing 2.

Of course, various developments and variants of the cartridge 1 and the valve including the latter, described thus far, can also be considered.

The invention claimed is:

1. A heating cartridge for a thermostatic element, including:
   a tube, which is thermally conductive and which is suitable for being immersed in a thermodilatable material of the thermostatic element, the tube comprising a cylindrical body, centered on a longitudinal axis and extending axially with a flare,
   an electric heater arranged inside the cylindrical body,
   a base made of a plastic material:
      secured to the tube by overmolding of the flare of the tube,
      supports an electric connection between the electric heater and an external current source, and
      is received in a housing of a casing, and
   a seal, which is attached to the base comprising:
      a first part which, when the base is received in the housing of the casing, is pressed radially against the casing in the housing so as to seal inside of the housing, and
      a second part, which is separate from the first part of the seal and which is pressed radially against the cylindrical body of the tube so as to seal an overmolding interface between the flare of the tube and the base.

2. The heating cartridge according to claim 1, wherein the first and second parts of the seal are made in one piece.

3. The heating cartridge according to claim 1, wherein the second part of the seal comprises a crow, which grips the cylindrical body of the tube and which is coupled to the first part of the seal by a discoid wall of the second part of the seal, this discoid wall extending transversely to the longitudinal axis and being designed to press the crown radially against the cylindrical body of the tube.

4. The heating cartridge according to claim 3, wherein the crown is toroidal.

5. The heating cartridge according to claim 3, wherein the discoid wall is provided with stiffening ribs that extend lengthwise substantially radially to the longitudinal axis.

6. The heating cartridge according to claim 5, wherein at least some of the stiffening ribs protrude from a face of the discoid wall, which is turned axially away from the base.

7. The heating cartridge according to claim 1, wherein first part of the seal includes a tubular wall, which is substantially centered on the longitudinal axis and has an axial end that couples the first part of the seal to the second part of the seal, and wherein the tubular wall is provided, on an inner face thereof, with a tongue that is engaged in a peripheral groove of the base to fasten the seal to the base, the peripheral groove being provided such that a first radial expanse of the tongue engages therein as long as the base is not inserted into the housing of the casing and such that a second radial expanse of the tongue, greater than the first radial expanse, engages therein when the base is inserted in the housing of the casing.

8. The heating cartridge according to claim 7, wherein the tubular wall is also provided, on a lower face thereof, with an inner bead, which is located axially between the tongue and said axial end of the tubular wall, and which is pressed axially against a stop of the base so as to keep the seal fastened to the base when the base is inserted axially into the housing of the casing.

9. The heating cartridge according to claim 7, wherein the tubular wall is provided, on an outer face thereof, with at least one outer bead or several outer beads, distributed along the longitudinal axis, this outer bead or each of these outer beads being suitable for radially contracting the tubular wall around the base when the base is axially inserted into the housing of the casing.

10. A thermostatic valve, including:
- a thermostatic element, comprising a heating cartridge, according to claim 1, and a cup containing a thermo-dilatable material in which the tube of the heating cartridge is immersed, and
- a casing delimiting a housing in which the base of the heating cartridge is received.

* * * * *